United States Patent [19]

Brand

[11] Patent Number: 4,951,764
[45] Date of Patent: Aug. 28, 1990

[54] DIGITAL DISPLAY SCALE

[75] Inventor: Winfried Brand, Michelstadt, Fed. Rep. of Germany

[73] Assignee: Jakob Maul GmbH, Bad Konig-Zell, Fed. Rep. of Germany

[21] Appl. No.: 438,585

[22] Filed: Nov. 17, 1989

[30] Foreign Application Priority Data

Nov. 18, 1988 [DE] Fed. Rep. of Germany ....... 3838990

[51] Int. Cl.$^5$ ........................... G01G 3/14; G01L 1/14
[52] U.S. Cl. ................................ 177/210 C; 73/862.64
[58] Field of Search .................. 177/210 C; 73/862.64

[56] References Cited

U.S. PATENT DOCUMENTS

| 4,308,929 | 1/1982 | Estavoyer | 177/210 C |
| 4,394,885 | 7/1983 | Dauge et al. | 177/210 C |
| 4,582,152 | 4/1986 | Gibbons | 177/210 C |
| 4,649,759 | 3/1987 | Lee | 177/210 C X |
| 4,846,293 | 7/1989 | Li | 177/210 C |
| 4,846,294 | 7/1989 | Sato | 177/210 C |
| 4,856,603 | 8/1989 | Murakoso et al. | 177/210 C |

FOREIGN PATENT DOCUMENTS

2914449 10/1980 Fed. Rep. of Germany .

Primary Examiner—George H. Miller, Jr.

[57] ABSTRACT

An improved digital display scale of the type with a load receiver acting on an arrangement of two parallel leaf springs which are movable relative to a base member, in which the leaf springs, a mounting support on the base and a load receiver supporting structure together form a parallelogram, and a capacitor with a pair of closely spaced capacitor plates the spacing between which changes under load to change capacitance and thereby serve as an indicator of load. One of the two capacitor plates is between the leaf springs and connected to the mounting support through an insulating piece. The other capacitor is formed by one of the leaf springs. Various preferred embodiments are also disclosed and claimed.

12 Claims, 4 Drawing Sheets

DIGITAL DISPLAY SCALE

FIELD OF THE INVENTION

This invention is related generally to scales with digital displays and, more particularly, to digital display scales of the type with a pair of leaf springs forming a depressible parallelogram and a pair of capacitor plates the spacing between which changes under load.

BACKGROUND OF THE INVENTION

More specifically, the invention relates to digital display scales having a load receiver acting on an arrangement of two parallel leaf springs which moves relative to a base member, whereby the leaf springs, together with a mounting support connected to a base member, and a supporting structure connected to the load receiver form a parallelogram, the scale also having a capacitor with two capacitor plates the spacing between which changes when the load receiver is subjected to a load such that capacitance can be evaluated as a measure of the load. Such devices have one of the two capacitor plates, which is between the leaf springs, connected to the mounting support through an insulating piece.

With scales of the type just mentioned, an example of which is seen in German Patent document No. DE-PS 2914449, the two capacitor plates are arranged between the two leaf springs and can be connected in a detachable manner to either the mounting support or the supporting structure through insulating parts. The subassembly consisting of the leaf springs, the insulating parts, and the capacitor plates can then be connected to the base member by means of screws. In order to achieve the desired accuracy with such scales of the prior art, not only do the capacitor plates, which are arranged between the parallel leaf springs, need to be adjusted, but the unit as a whole requires adjustment. This usually means that three components with at least four screws must be adjusted. This is considered a problem in that it is, above all, time-consuming.

OBJECTS OF THE INVENTION

It is an object of this invention to provide an improved digital display scale of the type generally described above which overcomes some of the problems and shortcomings of the prior art, including that mentioned above.

Another object of this invention is to provide an improved digital display scale of the type described in which adjustment is significantly simplified and made less time-consuming.

Another object of this invention is to provide an improved digital display scale which has fewer components for easier operation.

Another object of this invention is to provide an improved digital display scale in which harmful influences acting on the capacitors are minimized.

These and other important objects will be apparent from the descriptions of this invention which follow.

SUMMARY OF THE INVENTION

This invention provides an improved digital display scale which fulfills the objectives noted above. The characteristic features of this invention are set forth in the claims below.

The invention involves constructing one of the leaf springs of the parallelogram such that it also forms a capacitor plate and, with a capacitor plate which is arranged between the leaf springs, forms a capacitor. Thus, after the parallelogram weighing mechanism is connected to the base member, only one capacitor plate must be adjusted. That is, only the single capacitor plate between the leaf springs requires adjustment, such adjustment being with reference to the upper- or lower leaf spring which serves as the other capacitor plate.

Various preferred embodiments of the invention are defined in the dependent claims.

In a highly preferred embodiment of the invention, the leaf spring which forms the capacitor is essentially rectangular in shape, as seen in top view, such that the sides (edges) of the leaf spring which face the supporting structure and the mounting support, respectively, have recesses. The recesses (or cutouts), which can be fabricated, for example, by a stamping process, extend along the supporting structure and the mounting support and form corner mounting portions. It is particularly helpful for the recesses to be rectangular in shape and to provide spacing between the central section of the leaf spring and the supporting structure and the mounting support on either end.

The leaf spring which forms one of the capacitor plates is constructed such that, on the one hand, it has the elasticity of a conventional leaf spring and, on the other hand, ensures that the capacitance changes in a linear manner as a load is applied to the load receiver.

In another preferred embodiment of the invention, the supporting structure and the mounting support are each in the form of U-shaped metal support piece, with two horizontal portions interconnected by a vertical portion, such that the leaf springs can be connected to the horizontal portions and a carrier bracket on the base member can be connected to the vertical portion. The side of the mounting support facing the carrier bracket has grooves or flanges thereon which can be connected in a detachable manner to flanges or grooves, respectively, of the carrier bracket. The grooves are preferably on the metal support pieces, with the flanges being on the carrier bracket.

It is particularly preferred that the ends of the vertical portion of the U-shaped mounting support be bent in the direction of the carrier bracket to form opposed grooves which can be connected to the flanges of the carrier brackets in a form-fitting and locking manner.

With these inventive measures, it is essentially possible to connect the unit composed of the leaf springs, the supporting structure and the mounting support to the carrier bracket in a simple, but also very precise, manner. After this unit has been placed into the working position, it no longer needs to be adjusted.

In a highly preferred embodiment of the invention, the carrier bracket includes at least one angle piece which projects vertically upwardly from the base member and is rigidly connected thereto. Such carrier bracket is preferably such that, in horizontal cross-section, it is approximately L-shaped, one portion of the L forming the aforementioned flange for insertion into the groove in the metal support piece and extending parallel such support piece.

A particularly precise connection between the unit and the carrier bracket can be made if at least two such angle pieces are provided. The L of each such angle piece includes a longer portion along the flange portion, such longer portion extending perpendicularly to the metal support piece and being tapered toward the upper end. Such angle pieces are preferably interconnected by means of a cross piece which is rigidly attached thereto. One advantage of this arrangement is that simple stamped pieces with low tolerances are involved, such that construction of the entire scale is not only quicker, but is also more cost effective.

BRIEF DESCRIPTION OF THE DRAWINGS

Several preferred embodiments of the invention are illustrated in the drawings, in which.

DETAILED DESCRIPTIONS OF PREFERRED EMBODIMENTS

FIG. 1 to 4 represent a part of a digital display scale with a hood-like load receiver 18 which acts on a spring arrangement having two parallel leaf springs 10 and 12 and is movable with respect to a base member 16. Leaf springs 10 and 12, together with a mounting support 20 which is connected to base member 16 and a supporting structure 22 which is connected to load receiver 18, form a parallelogram-type weighing apparatus.

Figure 1:
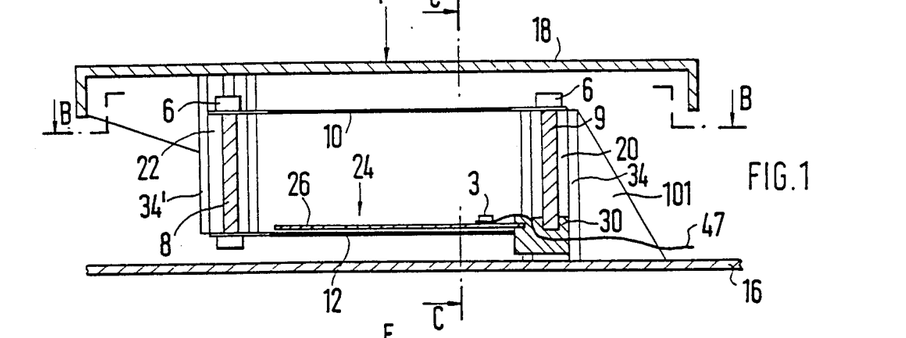
FIG. 1 is a vertical section, taken along section A—A as shown in FIG. 3, illustrating a preferred scale in which the second capacitor plate is the lower of the two leaf springs, such scale being shown in the unloaded condition.

The digital display scale also has a capacitor 24. One capacitor plate 26 of capacitor 24 is arranged between leaf springs 10 and 12 and, in the unloaded condition of the scale, extends in parallel with these. In the embodiment of FIG. 1, the other capacitor plate is formed by the leaf spring 12, while in the embodiment of FIG. 2 the other capacitor plate is formed by leaf spring 10. Capacitor plate 26 is connected to mounting support 20 through an insulating part 30.

Figure 2:
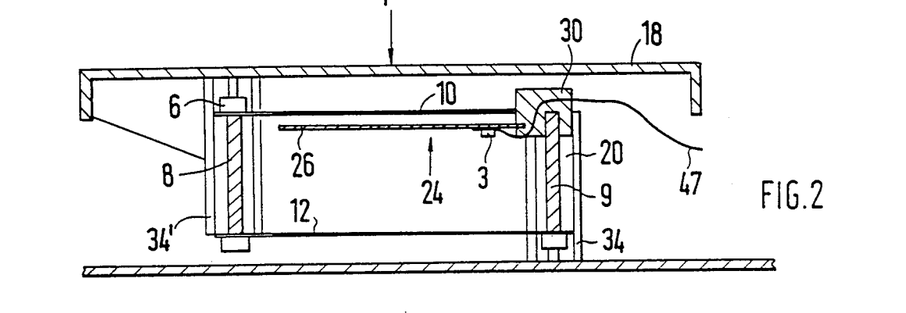
FIG. 2 is a similar vertical section, but showing another preferred scale in which the second capacitor plate is the upper leaf springs.

Leaf springs 10 and 12, together with supporting structure 22 and mounting support 20, form one unit which can be inserted from above into the grooves 1, 2 of the carrier bracket 34, 35, and detachably connected thereto. Carrier brackets 34 and 35 are integrally constructed with base member 16 and project upwardly in vertical fashion. Grooves 1 and 2 face each other and can be connected to mounting support 20 in a form-locking manner.

As already explained, either lower leaf spring 12 (as in FIG. 1) or upper leaf spring 10 (as in FIG. 2) forms the first capacitor plate, while the second capacitor plate 26, carried by insulating part 30, is located between such first capacitor plate and the other leaf spring. Insulating part 30 has a groove which extends in a perpendicular direction and which can be detachably connected to the cross piece 9 by means of a groove-spring connection.

The leaf spring (10 or 12) which forms the first capacitor plate covers the second capacitor plate 26 therebeneath or thereabove, as the case may be. As shown in FIGS. 1 and 2, the spacing between the two capacitor plates is small slight and dependent on the load on load receiver 18.

When load receiver 18 is subjected to a load as in FIG. 1, that is, in the direction of force F, load receiver 18 is moved downwardly, with the result that the spacing between capacitor plate 26 and lower leaf spring 12 is increased. As a result, the capacitance of the capacitor formed by these plates decreases.

Capacitor plate 26 is electrically connected by means of an electrical lead 47 to a measuring transformer and another electrical device (not shown) which digitalize the measured values from capacitor 24. There is a relationship between the measured capacitance and the weight of the object being weighed. The greater the load on load receiver 18, the greater the spacing between the free end of the capacitor plate 26 (see FIG. 1) and leaf spring 12.

Since insulating part 30 can be immovably connected to mounting support 20, the movements of load receiver 18 do not effect electrical lead 47. Lead 47 is securely connected to capacitor plate 26 by a pair of slits in capacitor plate 26, with the end of lead 47 extending through and immovably retained thereby. Such connection could, however, be by soldering or by means of screws.

In the embodiment of FIG. 2, if load receiver 18 is subjected to load then the spacing between the free end of capacitor plate 26 and leaf spring 10 decreases. Also, in this embodiment the movements of load receiver 18 are not transferred to lead 47, so that any interfering effects can be excluded completely.

Figure 3:
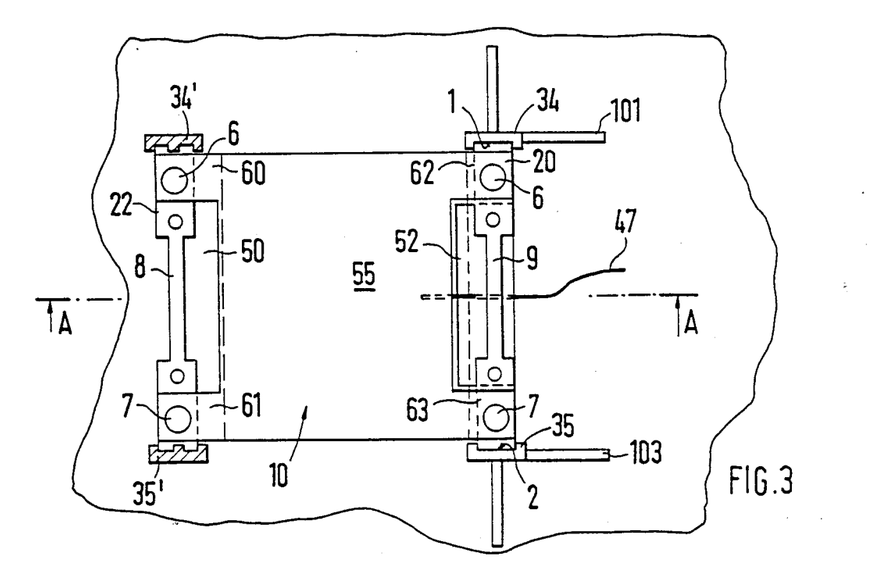
FIG. 3 is a plan section of the device of FIG. 1, taken along the section B—B as shown in FIG. 1.
Figure 4:
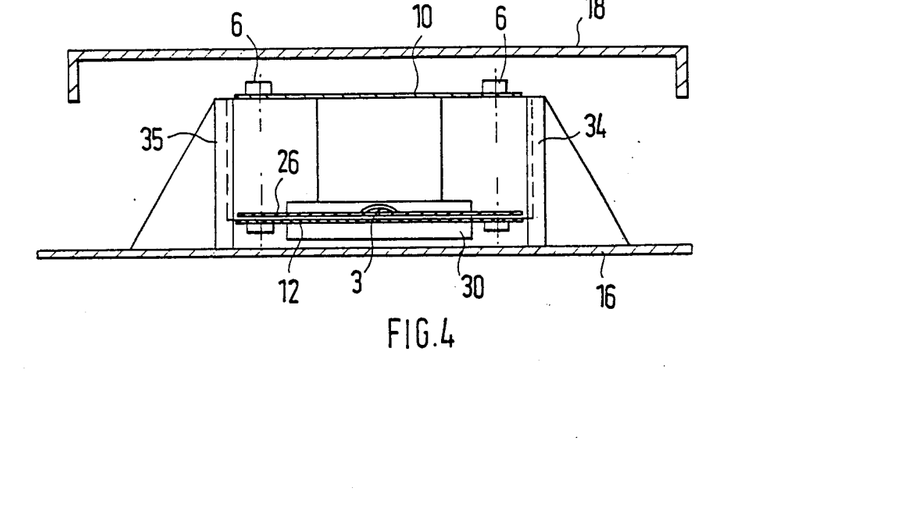
FIG. 4 is another vertical section, taken, however, along section C—C as shown in FIG. 1.

Mounting support 20 and supporting structure 22 are profile pieces having four bore holes therethrough and cross pieces 8 and 9, respectively (see FIG. 3). The bore holes on the edge serve to accommodate screws 6 and 7, which form secure connections of leaf springs 10 and 12 with each of mounting support 20 and supporting structure 22. Insulating part 30 is secured at cross piece 9.

The sub-assembly consisting of leaf springs 10 and 12, mounting support 20 and supporting structure 22 is detachably connected to carrier brackets 34 and 35, which are attached to base member 16 by means of supports 101 and 103. After establishing such connection, a secure connection can be established between load receiver 18 and this sub-assembly by means of the carrier brackets 34' and 35', which are integrally constructed with load receiver 18. The opposed sides of carrier brackets 34' and 3540 which face one another have two grooves and one cross piece and can be connected to supporting structure 22 in a form-locking manner.

FIG. 3 also shows that leaf spring 10, in top view, is rectangular in shape and has rectangular cutouts 50 and 52 on opposite sides. In the embodiment which is illustrated, leaf spring 10 is attached to supporting structure 22 and mounting support 20 by means of screws. However, it could be riveted to these parts.

Cutaways 50 and 52 are arranged with respect to supporting structure 22 and mounting support 20 such that there is clearance between these parts and the central section 55 of leaf spring 10. With such arrangement, the actual bending of leaf spring 10 occurs near the corner mounting portions 60–63 thereof. These corner mounting portions have lines of weakness and thereby bending lines extending parallel to cross pieces 8 and 9. If load receiver 18 is subjected to load, the bending of leaf springs 10 and 12 occurs in these areas. An S-shaped bending in the leaf springs under load, which has a harmful effect on measured results, is thereby excluded.

Figure 5:
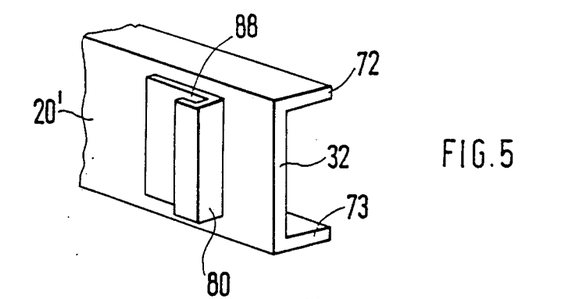
FIG. 5 is a fragmentary perspective view of a part of a mounting support in a lateral perspective view.
Figure 6:
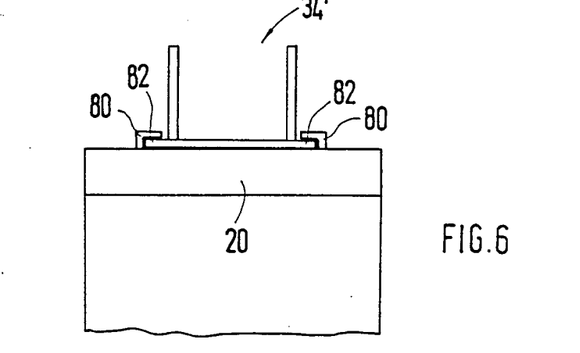
FIG. 6 is a top plan view of the mounting support of FIG. 5 showing it connected to a carrier bracket.
Figure 7:
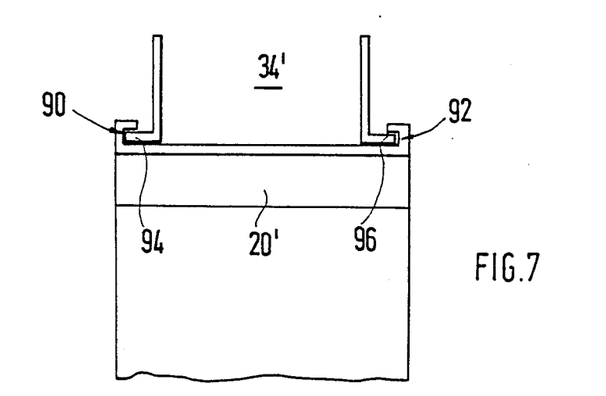
FIG. 7 is a top plan view as in FIG. 6, but illustrating an alternate embodiment.

FIG. 5 shows a structural variation in which a mounting support 20', a U-shaped open profile piece (or metal support piece), has a profile section 80 which is itself U-shaped in horizontal cross-section. Profile section 80 is attached so as to be detachable with a flange 82 of a carrier bracket 34". Profile section 80 forms a groove 88 into which flange 82 can be inserted from top to bottom. Instead of the form of groove 88, grooves could, of course, be constructed by bending the vertical ends of U-shaped mounting support 20' in the direction of the carrier bracket 34" to form opposed grooves 90 and 92, as shown in FIG. 7. Grooves 90 and 92 can be connected with springs 94 and 96 of a carrier bracket 34" in a form-fitting, locking manner.

Figure 8:
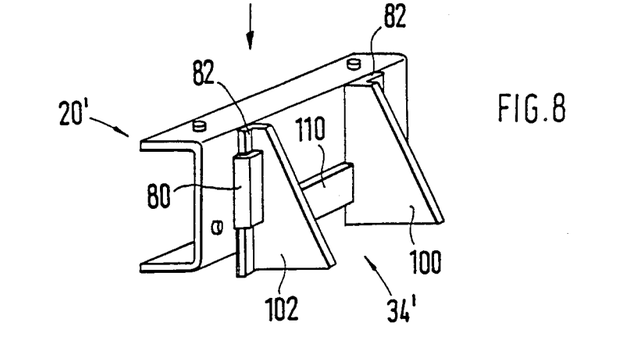
FIG. 8 is a perspective view of another mounting support with a carrier bracket attached thereto.
Figure 10:
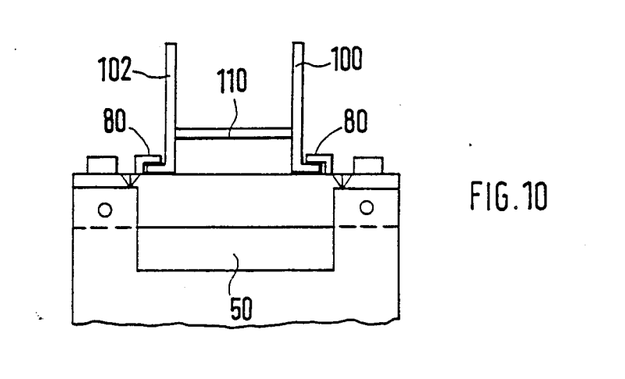
FIG. 10 a top plan view of the device of FIG. 8, taken in the direction indicated by arrow IX in FIG. 8.

FIGS. 8 and 10 show a connection in perspective view and top view, respectively, such that it can be seen that carrier bracket 34'" has two angle pieces 100 and 102 which project upwardly from the base member (not shown). In horizontal cross-section, angle pieces 100 and 102 aer L-shaped, such that the flanges 82 which engage grooves 88 of the mounting support 20' extend parallel to the mounting support 20' while the longer portions of the L's extends perpendicularly thereto. Such longer portions of the L-shaped angle pieces 100 and 102 are tapered toward the top and are connected to each other by means of a cross piece 110.

Figure 9:
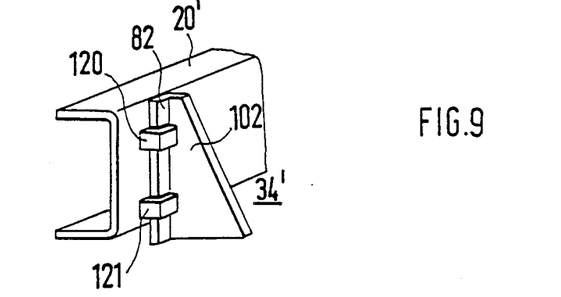
FIG. 9 a fragmentary perspective view of a another connection between a mounting support and a carrier bracket.

FIG. 9 illustrates a variation in which mounting support 20', instead of having profile sections 80 as described, in place of each profile section 80 has a pair of vertically-spaced U-pieces 120 and 121 which permit the insertion of flange 82 of a mounting support 34"".

While the principles of this invention have been described in connection with specific embodiments, it should be understood clearly that these descriptions are made only by way of example and are not intended to limit the scope of the invention.

I claim:

1. In a digital display scale of the type including a load receiver which acts on an arrangement of two substantially parallel leaf springs which are movable relative to a base member, in which the leaf springs, a mounting support connected to the base member, and a supporting structure connected to the load receiver together form a parallelogram, and a capacitor with two capacitor plates the spacing between which changes when the scale is subjected to a load such that capacitance may be evaluated as a measure of load, at least one capacitor plate being located between the leaf springs and connected to the mounting support through an insulating part, the improvement comprising:
   -one of the leaf springs forming one of the capacitor plates; and
   -the other capacitor plate being between the leaf springs and close to said one leaf spring, said other capacitor plate being connected to the mounting support through an insulating part.

2. The digital display scale of claim 1 wherein the the parallel leaf springs comprise lower and upper leaf springs, said lower leaf spring forming said one capacitor plate.

3. The digital display scale of claim 1 wherein the the parallel leaf springs comprise lower and upper leaf springs, said upper leaf spring forming said one capacitor plate.

4. The digital display scale of claim 1 wherein the leaf spring forming a capacitor plate is substantially rectangular and has opposite sides with cutaway portions which face the supporting structure, said cutaway portions forming corner mounting portions.

5. The digital display scale of claim 4 wherein the leaf spring forming a capacitor has a center section, said cutaway portions being of substantially rectangular shape and forming clearances between the leaf spring central section and the supporting structure and between the leaf spring central section and the mounting support.

6. The digital display scale of claim 1 including a base member with a carrier bracket and wherein:
   -the supporting structure and mounting support are each a metal support member formed in U-shaped cross-section and having horizontal portions interconnected by a vertical portion;
   -the leaf springs are connected to the horizontal portions; and
   -the carrier bracket is connected to the vertical portion of the metal support member along one surface of such vertical portion;
   and having the further improvement comprising:
   -said carrier bracket and said one surface of the metal support member having mating groove and flange means thereon for removable attachment of said carrier bracket with said metal support member.

7. The digital display scale of claim 6 wherein:
   -said carrier bracket has said flanges; and said one surface of the metal support member has said groove means thereon into which said carrier bracket flanges are removably inserted.

8. The digital display scale of claim 7 wherein:
   -the grooves and flanges extend vertically; and having the further improvement comprising:
   -the vertical portion of the metal support member having ends which are bent in the direction of the carrier bracket to form opposed grooves which are connected to the flanges of the carrier bracket in a form-fitting and locking manner.

9. The digital display scale of claim 8 wherein carrier bracket includes at least one angle piece which projects vertically upwardly from the base member and is rigidly connected thereto.

10. The digital display scale of claim 9 wherein the angle piece is approximately L-shaped in horizontal cross-section, whereby the flange of such angle piece, which is connected to the groove, is parallel to the vertical portion of the metal support member.

11. The digital display scale of claim 7 wherein there are at least two of said L-shaped angle pieces, each including a longer portion along the flange, such longer portions extending substantially perpendicularly to the metal support member and being tapered upwardly.

12. The digital display scale of claim 11 wherein said two angle pieces are interconnected by a cross piece rigidly connected thereto.

* * * * *

UNITED STATES PATENT AND TRADEMARK OFFICE
CERTIFICATE OF CORRECTION

PATENT NO. : 4,951,764
DATED : August 28, 1990
INVENTOR(S) : Winfried Brand

It is certified that error appears in the above-identified patent and that said Letters Patent is hereby corrected as shown below:

In column 4, line 10, change "small slight" to --small, slight--.

In column 4, line 29, change "effect" to --affect--.

In column 4, line 57, change "3540" to --35'--.

In column 5, line 16, change "34''" to --34'--.

In column 5, line 21, change "34''" to --34'--.

In column 5, line 23, change "34''" to --34'--.

In column 5, line 28, change "34'''" to --34'--.

In column 5, line 31, change "aer" to --are--.

In column 5, line 42, change "mounting support 34'''" to --carrier bracket 34'--.

In claim 2, line 1, change "the the" to --the--.

In claim 3, line 1, change "the the" --the--.

UNITED STATES PATENT AND TRADEMARK OFFICE
CERTIFICATE OF CORRECTION

Page 2 of 3

PATENT NO. : 4,951,764
DATED : August 28, 1990
INVENTOR(S) : Winfried Brand

It is certified that error appears in the above-identified patent and that said Letters Patent is hereby corrected as shown below:

The paragraphing structure of claim 6 is incorrect. The claim should be structured as follows:

COLUMN 6, line 21

--6. The digital display scale of claim 1 including a base member with a carrier bracket and wherein:

-the supporting structure and mounting support are each a metal support member formed in U-shaped cross-section and having horizontal portions interconnected by a vertical portion;

-the leaf springs are connected to the horizontal portions; and

-the carrier bracket is connected to the vertical portion of the metal support member along one surface of such vertical portion;

and having the further improvement comprising:

-said carrier bracket and said one surface of the metal support member having mating groove and flange means thereon for removable attachment of said carrier bracket with said metal support member.--

UNITED STATES PATENT AND TRADEMARK OFFICE
CERTIFICATE OF CORRECTION

PATENT NO. : 4,951,764

DATED : August 28, 1990

INVENTOR(S) : Winfried Brand

It is certified that error appears in the above-identified patent and that said Letters Patent is hereby corrected as shown below:

The paragraphing structure of claim 8 is incorrect. The claim should be structured as follows:
COLUMN 6, line 43
--8. The digital display scale of claim 7 wherein:
  -the grooves and flanges extend vertically;
and having the further improvement comprising:
  -the vertical portion of the metal support member having ends which are bent in the direction of the carrier bracket to form opposed grooves which are connected to the flanges of the carrier bracket in a form-fitting and locking manner.--

Signed and Sealed this

Eleventh Day of February, 1992

Attest:

HARRY F. MANBECK, JR.

*Attesting Officer*  *Commissioner of Patents and Trademarks*